Feb. 16, 1926. 1,573,416
F. P. NISTLE
FEEDING MECHANISM FOR CONTINUOUS BAKING OVENS
Filed July 17, 1924 2 Sheets-Sheet 2

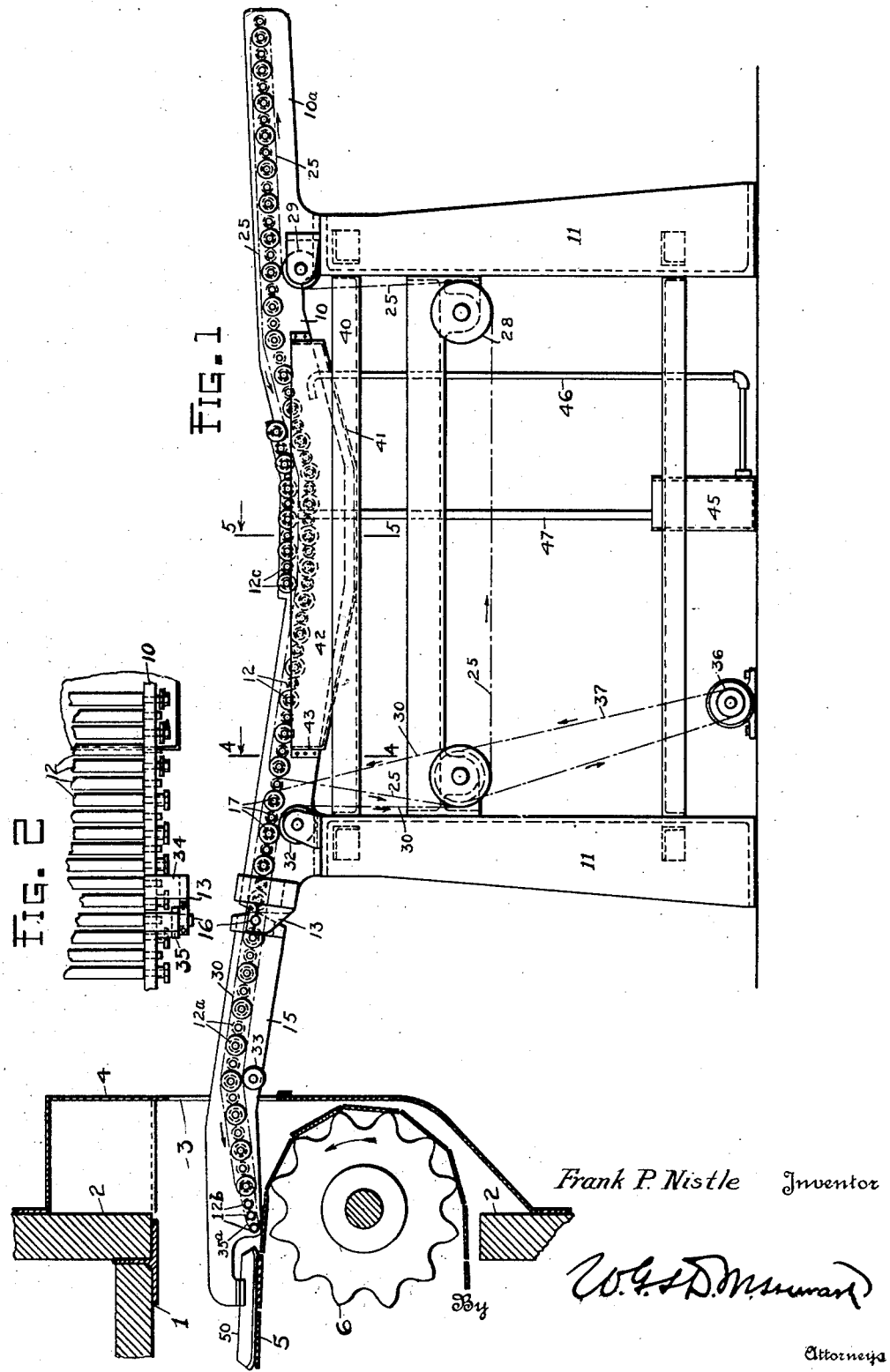

Frank P. Nistle Inventor

By *(signature)*

Attorney

Patented Feb. 16, 1926.

1,573,416

UNITED STATES PATENT OFFICE.

FRANK P. NISTLE, OF INTERVILLA, PENNSYLVANIA.

FEEDING MECHANISM FOR CONTINUOUS BAKING OVENS.

Application filed July 17, 1924. Serial No. 726,421.

*To all whom it may concern:*

Be it known that I, FRANK P. NISTLE, a citizen of the United States, residing at Intervilla, in Spring Township, in the county of Berks and State of Pennsylvania, have invented certain new and useful Improvements in Feeding Mechanism for Continuous Baking Ovens, of which the following is a specification.

My invention relates to feed mechanism for continuous baking ovens of the type having an endless-belt hearth; and more particularly to a roll-feed platform therefor adapted to receive the dough, to progressively advance the same, to subject the feeding dough, when desired, to a preliminary boiling operation by dipping the same into a submerging liquid bath, and finally to deliver the dough to the moving hearth of the oven.

My improvements are intended for and more particularly adapted to handling dough shapes unconfined by a retaining holder or pan, such as pretzels or the like; and they provide for quantity feeding of the entire contents of one or more peel boards direct from the proving racks, or from an automatic conveyor, without distortion of the pretzel shapes, so as to adequately fill the oven to its capacity and avoid wasteful unused space in the continuously moving hearth, necessarily occurring in the slow hand-feeding operation heretofore commonly employed.

With the foregoing objects in view, and with others that will appear later, my invention consists in the improved mechanism hereinafter fully described in connection with the accompanying drawings forming part thereof, and the novel features are more particularly pointed out in the subjoined claims.

Fig. 1 shows in side elevation a preferred embodiment of my invention positioned for feeding to the entrance end of a continuous baking oven, the latter being of known construction and only the feed end thereof being indicated in diagrammatic vertical section.

Fig. 2 is a partial plan view indicating a portion of one of the side frame plates and the ends of a few of the feed rolls mounted therein.

Figure 4:
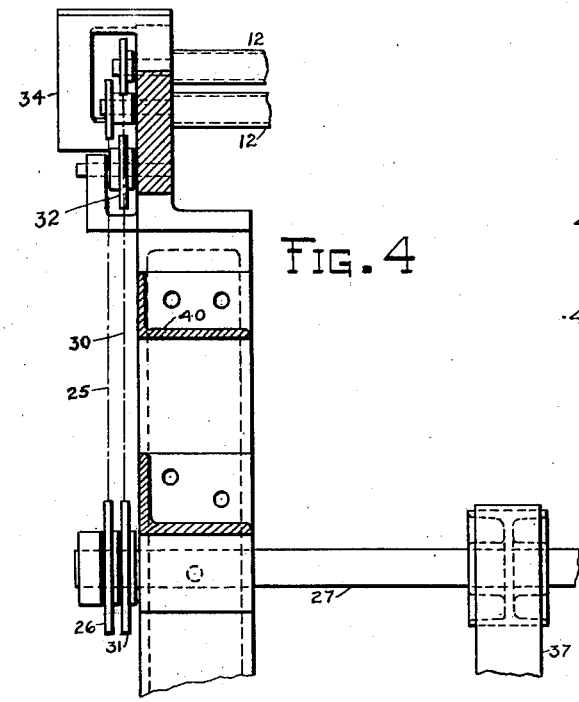
Fig. 4 is an enlarged fragmentary section on the line 4—4 of Fig. 1.
Figure 5:
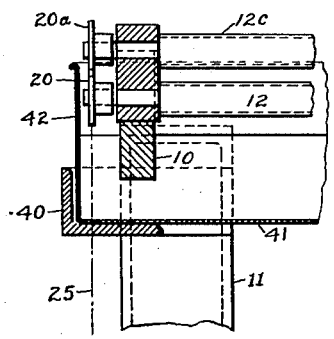
Fig. 5 is a corresponding section on the line 5—5 of Fig. 1.

Referring to the drawings, 1 indicates a continuous baking oven of known construction, 2 the end wall thereof having a feed aperture 3, and a closure 4 therefor, and 5 indicates the movable hearth, made up as heretofore, of an endless belt of connected metal plates rotatably carried by forward and rear drive wheels, the latter only being shown as indicated at 6. This oven is heated as heretofore in any convenient manner, and the speed of travel of the hearth is proportioned to the length of the oven and the particular baking operation, being such that dough fed thereto at the entrance end will be properly baked by the time the moving hearth carries it to the opposite delivery end where suitable removing mechanism may be employed. The hand method of feeding the pretzel dough to this moving hearth has been inadequate to utilize the full oven capacity, besides necessitating a larger feeding opening and a reduction of the heat adjacent the same to a temperature endurable to the operators. And while attempts have heretofore been made to mechanically feed to this moving hearth, I know of no successful device adequate for the purpose before the conception of my present invention, a preferred embodiment of which, as shown in the drawings, will now be described.

Fig. 1 shows but one side plate 10, and two legs or standards 11, 11 of the supporting frame of my device, but it will be understood an opposite side plate 10 and legs 11, 11 of like structure are employed, rigidly spaced apart a distance corresponding with the width of the oven hearth; and extending transversely of this frame, between said side plates 10, 10, with their ends engaged in bearings in the latter, are a series of closely alined parallel rolls 12 which form the feed platform of my mechanism. This platform, as shown, comprises a substantially horizontal conveying section having an intermediate depressed dipping portion and a receiving end portion carried in the rearwardly projecting extensions 10ª, 10ª of the side plates 10, 10, and a forward feeding section projected into the oven above the hearth; said feeding section being preferably formed, as shown, of a separate frame extension having side plates 15, 15 pivotally hinged at 16, 16 to lugs 13, 13 of side plates 10, 10, so that said section may have a relative independent movement for a purpose hereinafter more fully described. The rolls 12$^a$ in said feeding section are similar to the rolls 12, and are similarly carried in bearings in side plates 15, 15, except that the foremost rolls 12$^b$ of said section, contiguous to the hearth, are preferably of reduced diameter so as to more safely insure transfer of the moving pretzels from the platform to the moving hearth.

These rolls 12, 12$^a$ and 12$^b$ may be of any suitable material as best adapted for the purpose, and in order that they may engage the dough supported thereon and properly progress the same, I prefer to roughen their surfaces in any suitable manner as by grooving or pricking the surface to form projecting points thereon. In the present construction, as shown, I have made them from proper lengths of seamless steel tubing, the ends thereof being plugged with fixed axle extensions 17, 17 adapted to seat in bearings therefor carried in the respective side plates 10$^a$—10$^a$, 10—10 and 15—15, so as to be freely rotatable therein. And for purposes of ready removal and replacement of a single roll when required, I form these bearings, as shown, in separate blocks 18, 18 removably engaged in slotted openings 19, 19 of the respective plates, said blocks being retained in position by a cover strip 19$^a$.

Figure 3:
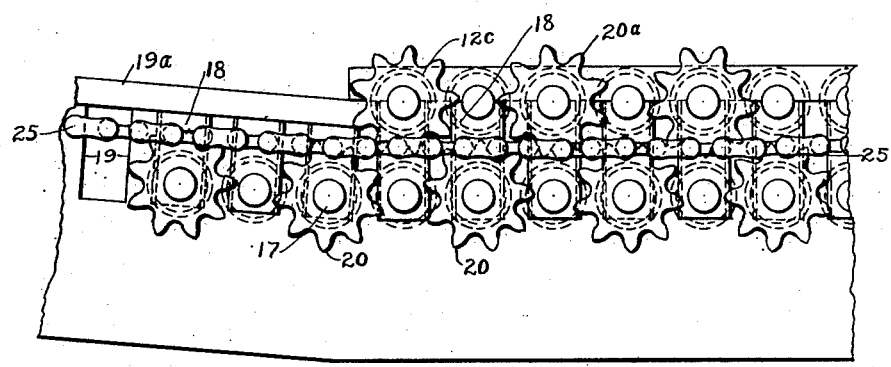
Fig. 3 is a greatly enlarged partial side view of a central portion of the feed rolls, indicating mainly a preferred driving means for the latter.

In order that the aforesaid roll platform may progressively feed the carried dough toward the oven, it is essential that some, if not all, of the rolls 12, 12$^a$, 12$^b$, be cooperatively driven, and in the present construction, as shown, I elect to drive all of them, and for this purpose provide each roll, at one end thereof, with a gear wheel 20 fixed to its axle 17 projecting beyond the bearing 18 therefor. And I also prefer, as shown, to apply these gear wheels 20 to the opposite ends of adjacent rollers, so that viewing each side, as clearly seen in Figs. 1 and 3, alternate rolls only appear to have gears, the intermediate rolls however having gears on their opposite ends. This staggered arrangement of the gears permits the use of larger diameter wheels and better proportioned gear teeth, while providing a gear wheel for each of the closely alined rolls. And for conveniently driving all the rolls cooperatively so the platform formed thereby will feed toward the oven, I preferably employ, as shown, link belts engaging the teeth of the respective gear wheels. One such belt is indicated at 25, passing over gear wheel 26 on main shaft 27, idler gears 28 and 29 and a series of gears 20 of rolls 12, while a similar belt 25, not shown, on on the opposite frame side engages with another main shaft gear, idlers and the gears 20 of the intermediate rolls 12; said belts 25, 25 driving, as shown, all the rolls 12 except a few adjacent the movable feeding section. These few rolls 12 and the rolls 12$^a$ of the feeding section, are driven in like manner by other link belts 30, 30 (the near one only being shown) engaging their respective gears 20 and main shaft gears 31, 31; idler wheels 32, 32 and 33, 33 guiding the return-bend portions of said belts, as shown. The lugs 13, 13 and pivot pins 16, 16, uniting the feeding section frame plates 15, 15 to the main frame plate 10, 10, are respectively formed, as clearly indicated, on spaced brackets 34 and 35 of said plates, spanning gears 20 and permitting free passage for belts 30, 30. And the reduced-size rolls 12$^b$ may be driven by short belts 35$^a$, 35$^a$, encircling their end gears and a second gear on the end pair of rolls 12$^a$. The main shaft is conveniently driven, as by a motor 36 and belt 37.

The belts 25, 25, engaging the gears 20 of rolls 12 in the intermediate dipping portion of the conveying section, would ordinarily require idlers in order to maintain them in contact with their respective gears in this depressed portion, but for a purpose hereinafter explained, I prefer to employ a superimposed platform in this dipping portion, as shown, composed of driven feed rolls 12$^c$ spacedly mounted in upward extensions of certain bearing blocks 18, 18, and each having a gear wheel 20$^a$, staggeredly arranged on opposite ends of adjacent rolls in the manner of gears 20 on rolls 12, said gears 20$^a$ not only acting to maintain belts 25, 25 in contact with their gears 20, but cooperatively driving their respective rolls 12$^c$, so that the feeding surfaces of said driven feed rolls 12$^c$ of the superposed platform section are operative in the same direction as the opposed feeding surfaces of the main feed rolls 12, but in separated planes arranged to provide free passage-way between them for the passing dough shapes with positive feeding of the latter whether they are carried upon the rolls 12 or floated into contact with the rolls 12$^c$ during the dipping operation required.

Beneath said dipping portion of the conveyor section, and supported on the intermediately outwardly bulged angle bars 40, 40, extending between the legs 11—11 and 11—11, is a liquid receptacle 41, the side walls 42 of which project upwardly outside gears 20, 20, and the end walls 43 of which are slotted to embrace the side plates 10, 10 and have a liquid tight joint with the latter. This receptacle is of such depth that its liquid when properly filled, will cover the rolls 12 in this dipping portion, and also more or less cover the rolls 12ᶜ of the superimposed platform, so that the feeding dough shapes will be completely submerged in this liquid bath as they pass between the rolls 12 and 12ᶜ. This bath is to provide a usual preliminary boiling operation, when required, and the liquid is heated in any desired manner, commonly by gas burners, not shown, supported directly beneath the receptacle 41; and my improved construction provides for this boiling operation without interfering with the steady progressive feed of the dough, the speed of rotation of the rolls 12 and 12ᶜ determining the proportionate length of the dipping portion for a determined time of boiling action. To insure this progressive feed through the liquid, particularly as the heated dough has a tendency to float free of its supporting roll 12, I have provided the superimposed platform rolls 12ᶜ, heretofore described, which are so spaced from rolls 12 as to form a passage-way in which only one layer of dough may travel, and the rolls 12ᶜ engage and feed forward any floating dough, preventing piling up in said passage-way and insuring ordered progress through the receptacle 41.

To maintain a constant liquid level in receptacle 41, a supply tank 45 is shown, connected by inlet pipe 46 and fixed height overflow pipe 47 to said receptacle 41, and any convenient pump, not shown, forces a constant replenishing flow from said supply tank through pipe 46, while pipe 47 returns any excess; the liquid in the supply tank being renewed from time to time as required.

The proven dough shapes, laid as usual in closely arranged order on peel boards, or on an automatic conveyor where such is employed, may be conveniently transferred to the conveyor section of my improved platform, a peel board load at a time, or continuously from said conveyor. And the dough shapes thus transferred to the platform, are first carried in ordered arrangement through the liquid bath as above described, with the rotated upper rolls 12ᶜ insuring like forward movement to any floating shapes, and then to the feeding section projecting into the oven, where the reduced size rolls 12ᵇ gently transfer the shapes to the moving oven hearth 5. When desired, a salting device may be employed to shake a proper supply of salt on the passing boiled pretzel shapes before they enter the oven.

The plates forming the endless belt hearth 5 of the oven, in making the return bends around their drive wheels, incline at changing angles until they assume horizontal position in the straight-run portions thereof between said end wheels; and to insure proper close positioning of the rolls 12ᵇ without actual contact with said hearth, I have made the feeding section relatively movable as heretofore described, and I preferably provide each side plate 15, 15 with a shoe 50, 50, adapted to ride on said hearth 5 or the side drive chains thereof, so that said feeding section may shift as required with the undulations of the hearth plates. This permits feeding to the moving hearth closer to the return-bend portion thereof, thus lengthening the useful baking length of the oven; while my extended feeding section requires but a small entrance aperture to the oven, and a consequent conservation of the heat therein, which may be increased, if desired, to a baking temperature close to said entrance end.

My improvements thus fully described provide in a convenient and substantial structure, means for readily feeding in quantities adequate to the capacity of the oven, for transferring the dough shapes without distortion to the moving hearth, and for subjecting the dough to a preliminary boiling operation when required, in a simple manner and during the continuous progressive feed thereof. It will be understood, of course, that the speed of feed of my roll platform will be determined by the speed of travel of the oven hearth, and the proportions indicated in the drawings, particularly as to the length of the depressed dipping portion, are merely illustrative and will vary with the needs. And omissions and additions as required by the particular baking operation, as well as modifications in the specific construction above detailed, may be readily devised without departing from the spirit of my invention as particularly pointed out in the claims.

What I claim is:

1. Apparatus for continuously delivering pretzels or like dough shapes to an endless belt oven hearth; comprising a receptacle for treating liquid, and a feed platform made up of feed rolls which have their feeding surfaces positively rotated in the same direction and at the same speed; a series of said rolls forming a lowered feed section arranged to dip into said receptacle.

2. Apparatus for continuously delivering pretzels or like dough shapes to an endless belt oven hearth; comprising a receptacle for treating liquid, and a feed platform made up of feed rolls which have their feeding surfaces positively rotated in the same direction and at the same speed; a series of said rolls forming a lowered feed section arranged to dip into said receptacle, and another series forming a feed section spaced above said lowered series so as to operate upon the upper surfaces of passing shapes.

3. Apparatus for continuously delivering pretzels or like dough shapes to an endless belt oven hearth; comprising a receptacle for treating liquid, and a feed platform made up of feed rolls which have their feeding surfaces positively rotated in the same direction and at the same speed; a series of said rolls forming a lowered feed section arranged to dip into said receptacle, and another series forming a feed section spaced above said lowered series so as to operate upon the upper surfaces of passing shapes, and all of said rolls being rotated by an engaging drive chain arranged in an intermediate plane.

4. Apparatus for continuously delivering pretzels or like dough shapes to an endless belt oven hearth; comprising a receptacle for treating liquid, and a feed platform made up of feed rolls which have their feeding surfaces positively rotated in the same direction and at the same speed; an end series of feed rolls being mounted in a swinging extension of the main feed platform and being of reduced diameter but positively driven at uniform surface speed to form a hearth-delivering section.

5. The combination with a continuous oven having an endless movable hearth; of a feed platform therefor comprising a conveying section having an intermediate depressed dipping section with a spaced superimposed feed platform, said platforms being made up of fixedly mounted alined parallel feed rolls, drive wheels on the alternate ends of successive rolls, and drive belts engaging said wheels to cooperatively rotate said rolls, the wheels of the superimposed rolls deflecting said belts to maintain their engagement with the wheels of the rolls in said depressed section.

In testimony whereof I affix my signature.

FRANK P. NISTLE.